United States Patent
Bahr et al.

(10) Patent No.: US 8,797,885 B2
(45) Date of Patent: Aug. 5, 2014

(54) METHOD FOR DATA TRANSMISSION IN A LOCAL AREA NETWORK

(75) Inventors: Michael Bahr, München (DE); Norbert Vicari, München (DE)

(73) Assignee: Siemens Aktiengesellschaft, Munich (DE)

( * ) Notice: Subject to any disclaimer, the term of this patent is extended or adjusted under 35 U.S.C. 154(b) by 469 days.

(21) Appl. No.: 13/128,167

(22) PCT Filed: Oct. 28, 2009

(86) PCT No.: PCT/EP2009/064225
§ 371 (c)(1),
(2), (4) Date: May 6, 2011

(87) PCT Pub. No.: WO2010/052162
PCT Pub. Date: May 14, 2010

(65) Prior Publication Data
US 2011/0211461 A1    Sep. 1, 2011

(30) Foreign Application Priority Data

Nov. 7, 2008  (EP) ..................... 08019541
Jun. 30, 2009  (EP) ..................... 09008588

(51) Int. Cl.
*H04W 74/08*  (2009.01)
*H04L 1/18*  (2006.01)
*H04L 1/00*  (2006.01)

(52) U.S. Cl.
CPC ......... *H04W 74/0891* (2013.01); *H04L 1/1887* (2013.01); *H04L 2001/0092* (2013.01)
USPC ..................................................... 370/245

(58) Field of Classification Search
CPC ............ H04W 74/0891; H04L 1/1887; H04L 2001/0092
USPC .......................................................... 370/245
See application file for complete search history.

(56) References Cited

U.S. PATENT DOCUMENTS 6,779,146 B1    8/2004  Jones et al.
7,133,396 B1 *  11/2006  Schmidl et al. ............... 370/347

(Continued)

FOREIGN PATENT DOCUMENTS

| CN | 1675865 A | 9/2005 |
|---|---|---|
| CN | 1723631 A | 1/2006 |

(Continued)

OTHER PUBLICATIONS

Bhatti et al., Extending the MAC Super-frame of 802.15.4 Spec, Aug. 2008, https://mentor.ieee.org/802.15/dcn/08/15-08-0420-02-004e-extending-the-mac-superframe-of-802-15-4-spec-ppt.ppt (19 pages).

(Continued)

*Primary Examiner* — Luat Phung
(74) *Attorney, Agent, or Firm* — Cozen O'Connor (57) ABSTRACT

A method for data transmission in a local are network, wherein data is transmitted on the Media Access Control (MAC) layer within successive time frames between a plurality of first nodes comprising client nodes to a second node comprising a coordinator node for the plurality of first nodes. A synchronizing slot for sending a synchronizing message from the second node to the first nodes includes acknowledgements for time slots used for data transmissions in previous time frames from the first nodes to the second node. The acknowledgements indicate whether a data transmission in the previous time frame was successful. Based on these acknowledgements, retransmission time slots included in the current time frame are used for retransmitting data that have not been transmitted successfully in a time slot of the previous time frame.

21 Claims, 3 Drawing Sheets

(56) References Cited

U.S. PATENT DOCUMENTS

| | | |
|---|---|---|
| 2004/0032853 A1 | 2/2004 | D'Amico et al. |
| 2004/0190552 A1 | 9/2004 | Kim et al. |
| 2006/0239293 A1* | 10/2006 | Vasil'evich et al. .......... 370/445 |
| 2007/0211620 A1 | 9/2007 | McBeath et al. |
| 2008/0049670 A1* | 2/2008 | Cho et al. ...................... 370/329 |
| 2008/0117929 A1* | 5/2008 | Kliger et al. .................. 370/442 |
| 2009/0052356 A1* | 2/2009 | Lim et al. ...................... 370/280 |
| 2009/0067389 A1* | 3/2009 | Lee et al. ...................... 370/336 |

FOREIGN PATENT DOCUMENTS

| | | |
|---|---|---|
| CN | 101136727 A | 3/2008 |
| EP | 1 133 094 | 9/2001 |
| JP | 6-177863 | 6/1994 |
| JP | 2000-69547 | 3/2000 |
| WO | WO 2006/049415 | 5/2006 |
| WO | WO 2008127631 A1 | 10/2008 |

OTHER PUBLICATIONS

Bahr et al., Proposal for Factory Automation, Sep. 2008, https://mentor.ieee.org/802.15/dcn/08/15-08-0572-00-004e-proposal-for-factory-automation.doc (19 pages).

* cited by examiner

| 1 | ... | m | m+1 | ... | m+n |
|---|---|---|---|---|---|
| A2 | ... | A2 | A1 | ... | A1 |

FIG 4

| 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|
| 0 | 0 | 0 | 0 | 1 | 1 | 1 | 1 | 1 | 1 | 1 | 1 | 1 | 1 | 1 | 1 | 1 | 1 | 1 | 1 |

FIG 5

| 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|
| 0 | 0 | 0 | 0 | 1 | 1 | 1 | 1 | 1 | 0 | 0 | 1 | 1 | 0 | 1 | 1 | 0 | 1 | 1 | 0 |

FIG 6

| 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 1 | 1 | 1 | 1 |

FIG. 7

METHOD FOR DATA TRANSMISSION IN A LOCAL AREA NETWORK

CROSS-REFERENCE TO RELATED APPLICATIONS

This is a U.S. national stage of International Application No. PCT/EP2009/064225, filed on 28 Oct. 2009. This patent application claims the priority of European Patent Application Nos. 08019541.5, filed 7 Nov. 2008 and 09008588.7, filed 30 Jun. 2009, the entire content of which applications are incorporated herein by reference.

BACKGROUND OF THE INVENTION

1. Field of the Invention

The invention relates to a communications network and, more particularly, to a method for data transmission in a local area network and a corresponding network.

2. Description of the Related Art

For many applications, local area networks have to fulfil certain requirements with respect to a data transmission in the network. For example, in wireless factory automation sensor systems in which the local area network comprises sensor nodes and a base station collecting data from the sensor nodes, cyclic data traffic characteristics have to be kept with respect to low latency and packet loss rates.

To fulfil these requirements, certain mechanisms for a data transmission are provided in the L2 or Media Access Control (MAC) layer of the well-known Open System Interconnection (OSI) reference model.

In the Institute of Electrical and Electronics Engineers (IEEE) 802.15.4 standard defining the MAC layer for data transmissions in wireless sensor networks, the use of acknowledgements for confirming a successful data transmission is described. After a data transmission, the sender and receiver switch the sending direction and the receiver sends an acknowledgement when the data was received correctly. If an acknowledgement is not received by the sender within a certain time interval, it can attempt to retransmit the data. Ghulam et al., "Extending the MAC Superframe of 802.15.4" Spec, August 2008 ("Ghulam"), referring to the aforementioned standard, proposes a MAC frame structure including acknowledgements and time slots reserved for retransmission of data not transmitted successfully. According to the time frame structure in this publication by Ghulam, many time-consuming changes between the transmission directions within a time frame are performed during data transmission.

Bahr M. et al.: Proposal for Factory Automation, September 2008, ("Bahr") discloses a proposal for IEEE standard 802.15.4e being an extension of IEEE standard 802.15.4 designed for sensor networks usable in factory automation environments.

The Bahr document describes the transmission of group acknowledgements for acknowledging a number of transmissions within a single acknowledgment. This group acknowledgement is included in a beacon that is a synchronising message at the beginning of a time frame. The Bahr document, however, does not describe a mechanism for retransmitting lost data.

SUMMARY OF THE INVENTION

It is therefore an object of the present invention to provide a method for data transmission in a local area network enabling an efficient retransmission of lost data based on mechanisms in the Media Access Control (MAC) layer.

This and other objects and advantages are achieved in accordance with the invention by providing a method or network in which data is transmitted on the MAC layer within successive time frames (i.e., superframes) between a plurality of first nodes comprising client nodes and a second node comprising a coordinator node for the first nodes. In accordance with the invention, a current time frame comprises a synchronizing slot for sending a synchronising message from the second node to the first nodes to synchronise the data transmission between the first nodes and the second node. Furthermore, a plurality of time slots is provided in the current time frame. This plurality of time slots comprises a number of first and second slots, where each first slot is used for transmitting data from a first node to the second node for the first time and each second slot is used for retransmitting data from the first node to the second node for the second or a later time.

In the frame structure in accordance with the invention, the synchronising slot includes first acknowledgements for first slots, where each first slot of a previous time frame preceding the current time frame is associated with a first acknowledgement, where a positive first acknowledgement for a first slot indicates that a data transmission in the first slot was successful. Additionally, a negative first acknowledgement indicates that the data transmission was unsuccessful, where a second slot of the current time frame is used by a first node for retransmitting data previously transmitted by the first node in a first slot of the previous time frame if the first node receives a negative first acknowledgement for the first slot in the synchronising slot.

The method in accordance with the invention enables a simple and efficient mechanism for retransmitting data. Particularly, by including acknowledgements for data transmissions within the synchronising slot, the number of changes in the transmission direction in a time frame is very low. Hence, delays for switching the transmission directions are reduced, thus enabling a fast transmission of data with low data loss rates.

In a preferred embodiment, the data is transmitted in a wireless personal area network, i.e., in a wireless sensor network, where each first node represents a sensor transmitting sensor data to the second node representing a base station in the sensor network. An example of such a sensor network is described in the Bahr publication. In the following, a sensor refers to a wireless device having the function to send data. If such a device also has the function of receiving data from the base station, it may also be called actuator. In a preferred embodiment, the data in the wireless personal area network is transmitted according to the IEEE standard 802.15.4, particularly according to the IEEE standard 802.15.4e provided for sensor and actuator networks for factory automation.

In a preferred embodiment, the first acknowledgements are included in the synchronising message. Nevertheless, it is also possible that the first acknowledgements are sent immediately before or after the synchronising message.

In another embodiment, the first slots are arranged in a sequence of successive first slots and the second slots are arranged in a sequence of successive second slots in a time frame, where the sequence of second slots is preferably arranged before the sequence of first slots. The presently contemplated embodiment enables an efficient implementation of assignment schemes for second slots used for retransmitting data to first nodes. It also ensures that the retransmission occurs before the next data transmission of a first node.

The assignment of second slots in a current time frame to first nodes, for which the data transmission in a first slot of the previous time frame was unsuccessful, may be performed by the second node. To do so, the corresponding information about the association of second slots to first nodes is to be transmitted from the second node to the first nodes, e.g., within the synchronising slot.

In another embodiment, successive slot numbers are assigned to the first slots in the chronological order of the occurrence of the first slots in the current time frame, where each slot number assigns a first slot to a predetermined first node using the first slot for a data transmission. Successive slot numbers may also be assigned to the second slots in the chronological order of the occurrence of the second slots in the current time frame.

By using slot numbers, a rule based procedure for assigning second slots for retransmitting data to first nodes can be implemented. Particularly, a first node intending to retransmit data due to a negative first acknowledgement for a first slot with a given slot number determines the slot number of the second slot to be used for retransmission by the following steps:

i) scanning the first acknowledgements in the synchronising slot to determine the number of unsuccessful data transmissions in the first slots having slot numbers smaller than the given slot number; and ii) determining the slot number of the second slot to be used for retransmission as the number of the unsuccessful transmissions plus one.

The information indicating which first node uses a second slot may be transmitted within the respective second slot to the second node. However, in a preferred embodiment, the second node uses the same rule based procedure to determine the first node that transmitted the data within a second slot. To do so, the second node transmitting the first acknowledgements in the synchronising slot determines for a first slot with a given slot number and associated with a negative first acknowledgement the slot number of the second slot used for retransmitting the data previously transmitted in the first slot by the following steps:

a) scanning the first acknowledgment in the synchronising slot to determine the number of unsuccessful data transmissions in first slots having slot numbers smaller than the given slot number; and b) determining the slot number of the second slot used for retransmission as the number of the unsuccessful transmissions plus one.

In a preferred embodiment, a first node does not retransmit data due to a negative first acknowledgement for a first slot with a given slot number in case that a number of unsuccessful data transmissions determined in step i) of the above procedure is not smaller than the total number of second slots in the current time frame. The presently contemplated embodiment avoids data collisions in cases that the number of second slots is smaller than the number of unsuccessful data transmissions.

In another preferred embodiment, successive slot numbers are assigned to all time slots in the chronological order of the occurrence of the time slots. Hence, the same numbering scheme is used for both the first slots and the second slots.

In another embodiment, at least some of the first slots are concatenated to one or more groups of successive first slots, where the data in a group of first slots is retransmitted if the data transmission in the group of first slots is unsuccessful. To do so, a mechanism may be provided which generates negative first acknowledgements for all first slots in a group of first slots if the data transmission in this group is unsuccessful. If the data transmission in this group is successful, positive first acknowledgements are generated for all first slots of the group.

In another embodiment, a synchronising slot of a current time frame includes second acknowledgements for second slots, where each second slot of a previous time frame preceding the current time frame is associated with a second acknowledgement, where a positive second acknowledgement for a second slot indicates that a data transmission in the second slot was successful and where a negative second acknowledgement indicates that a data transmission in the second slot was unsuccessful. By using acknowledgements for second slots, several retransmissions of the same data may be performed. To do so, a second slot is used by a first node for retransmitting data previously transmitted by the first node in a second slot of a previous time frame if the first node receives in the synchronising slot a negative second acknowledgement for the second slot.

Besides the above described method, the invention also refers to a local area network, comprising a plurality of first nodes being client nodes and a second node being a coordinator node for the first nodes, wherein the network is configured such that the method for data transmission in accordance with the method of the invention can be performed.

Other objects and features of the present invention will become apparent from the following detailed description considered in conjunction with the accompanying drawings. It is to be understood, however, that the drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Embodiments of the invention will now be described in detail with respect to the accompanying drawings, in which.

DETAILED DESCRIPTION OF THE PREFERRED EMBODIMENT

In the following, an embodiment of the invention will be described based on a data transmission according to the proposal to the IEEE standard 802.15.4e. In general, the IEEE standard 802.15.4 defines the MAC layer according to the OSI reference model for wireless and low power transmission of sensor data. The proposal to the IEEE standard 802.15.4e is a specific version of IEEE standard 802.15.4 used for data transmission between sensors and actuators in factory automation. A sensor refers to a wireless device configured for transmitting data to a base station or gateway. A device which has the functionality of a sensor and is additionally able to handle data transmissions from the base station to the device is called actuator. Hence, an actuator can be regarded as a sensor having the additional functionality of a downlink transmission from the gateway to the actuator. In the disclosed terminology which is also used in the following, a sensor or actuator corresponds to a first node whereas the gateway or base station corresponds to a second node.

As mentioned above, the IEEE standard 802.15.4e is designed for factory automation, where sensors and actuators are located, for example, at robots, suspension tracks and portable tools in the automotive industry, collect data on machine tools, such as milling or turning machines, and control revolving robots. Further application areas are control of conveyor belts in cargo or logistics scenarios or special engineering machines. Depending on the specific needs on different factory automation branches, many more examples can be named. Common to sensor applications in factory automation is the requirement of low latency and high cyclic determinism. As a consequence, the performance should allow for reading sensor data from 20 sensors within 10 milliseconds. The IEEE standard 802.15.4e fulfils the needs of factory automation by using a fine granular Time Division Multiple Access (TDMA) access, where in a superframe structure guaranteed time slots for deterministic access are assigned to corresponding first nodes.

Figure 1:
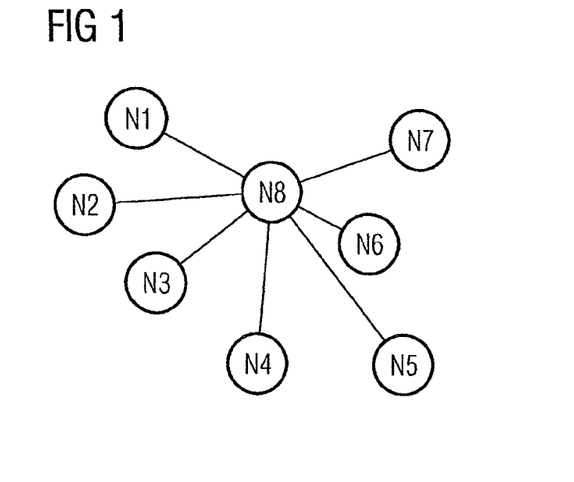
FIG. 1 shows an example of a personal area network in which an embodiment of the method in accordance with the invention is implemented.

FIG. 1 shows an example of a wireless sensor network in a star topology of the IEEE standard 802.15.4e. In this example, nodes N1, N2 ... N7 correspond to first nodes, i.e., sensors or actuators, communicating with a second node N8 comprising a gateway to the wireless network. Based on the topology shown in FIG. 1, an embodiment of the data transmission method in accordance with the invention will be described.

The method described in the following refers to an improvement of the IEEE standard 802.15.4e enabling the retransmission of data packets within so-called superframes. The general formats for beacon frames, data frames, and the superframe are based on the formats described in Bahr publication.

Figure 2:
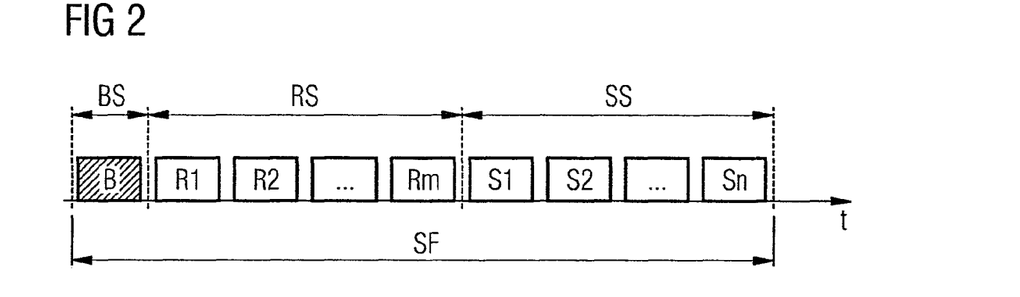
FIG. 2 shows an example of a time frame used in an embodiment of the invention.

FIG. 2 shows along the horizontal time axis t the structure of a superframe SF used in the method described herein and enabling the retransmission of data packets lost on the transmission path from a first node to a second node. The superframe SF shown in FIG. 2 corresponds to a time frame and comprises at the beginning a beacon time slot BS including a beacon B which is used for synchronising the first nodes to enable a TDMA-based data transmission from the first nodes to the second node. The retransmission methodology described in the following is based on acknowledgements accumulated and integrated in the beacon B. Those acknowledgements indicate whether a data transmission for a certain first node in the preceding superframe was successful (corresponds to a positive acknowledgement) or unsuccessful (corresponds to a negative acknowledgement). The acknowledgements of the last superframe are collected by the second node and included in the beacon B as will be described with respect to FIG. 3. Hence, besides the function for synchronising the first nodes, the beacon also ensures that all first nodes are informed of the success or failure of previous data transmissions.

In the example described herein, the acknowledgements are included in the beacon message B itself. Nevertheless, it is also possible to use separate messages. Particularly, the acknowledgments may be transmitted immediately before or after the beacon B either within or next to the beacon time slot. In the superframe structure of FIG. 2, the beacon time slot BS is followed by time slot sequences RS and SS. The time slots RS correspond to time slots for retransmitting data packets, i.e., for data packets that have not been transmitted successfully within the preceding superframe. According to FIG. 2, the retransmission time slots are named as R1, R2 ... Rm. The number m of retransmission time slots can be arbitrary but should be substantially smaller than the number of transmission slots (i.e., time slots for the first transmission of corresponding data) that are located in the time sequence SS. Those transmission slots are designated as S1, S2 ... Sn, i.e., n corresponds to the number of transmission slots.

In accordance with to the superframe structure in FIG. 2, there is a fixed assignment of each transmission slot to a first node so that each first node transmits data in a predetermined transmission slot. Furthermore, for each retransmission in a superframe, there is also a deterministic assignment of a retransmission slot to a first node retransmitting data. However, this TDMA-based scheme is not mandatory and the contemplated embodiments of the invention may also be implemented for a Carrier Sense Multiple Access (CSMA) scheme, where retransmission time slots are assigned to the first nodes on a contention-based random access scheme. However, the CSMA mechanism requires time slots that are significantly larger than necessary because of the needed time for the contention and because the addresses of the senders have to be included in the data packets so that the second node is informed about the origin of the received data packets. Contrary to that, the sender address needs not be included in the data packets when a TDMA-based scheme is used because a sender may be identified due to the position of the time slot within the superframe.

The assignment of the retransmission slots shown in FIG. 2 to first nodes may be scheduled by the second node based on the information about failed data transmissions, i.e., unreceived data packets, within the previous superframe. The information of this assignment may then be transmitted within the beacon B or beacon time slot BS to the first nodes. However, in a preferred embodiment, a distributed methodology, i.e., rules for the usage of retransmission slots on the first nodes, is used so that each first node determines a retransmission slot by itself. This distributed algorithm is also used in the second node so that the second node also has the information about the assignment of the retransmission slots to the respective first nodes.

Figure 3:
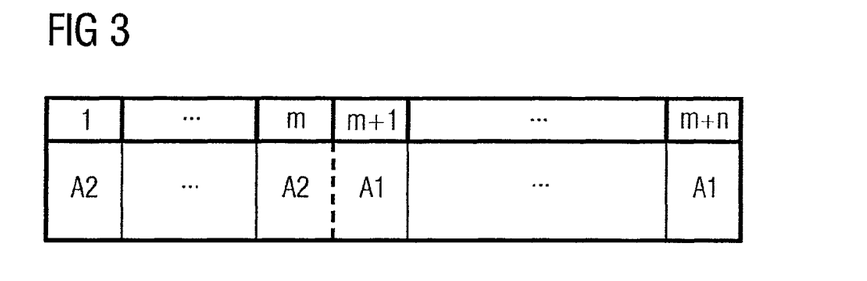
FIG. 3 shows an example of first and second acknowledgements included in a beacon in accordance with an embodiment of the invention.

In accordance with a preferred embodiment of a distributed methodology for assigning retransmission slots to first nodes, a retransmission slot number is derived from the position of the corresponding negative acknowledgement included in the beacon B. FIG. 3 shows the arrangement of the acknowledgements in the beacon B. Each acknowledgement is represented by a corresponding bit indicated by numbers 1, 2 ... m and m+1, m+2 m+n. The bit numbers m+1 to m+n refer to acknowledgments A1 which are acknowledgements for transmission slots S1 to Sn shown in FIG. 2. In other words, bit m+1 refers to the acknowledgment for slot S1, bit m+2 to the acknowledgement for slot S2, ... , and bit m+n to the acknowledgement for slot Sn. Bits 1 to m are optional and refer to acknowledgments A2 for the retransmission slots R1 to Rm. That is, bit 1 refers to the acknowledgement for retransmission slot R1, bit 2 to the acknowledgement for retransmission slot R2, ... , and bit m to the acknowledgement for retransmission slot Rm. The acknowledgements A2 have the advantage that a first node is informed about a failed retransmission. This information may be provided to a layer above the MAC layer to initiate corresponding algorithms for retransmitting those failed data packets in higher layers. All acknowledgements A1 and A2 indicate by corresponding bit values whether a data transmission was successful or unsuccessful. Particularly, a negative acknowledgement may correspond to the bit value 0 and a positive acknowledgment to the bit value 1 or a negative acknowledgement may correspond to the bit value 1, and a positive acknowledgement to the bit value 0.

The acknowledgements shown in FIG. 3, which form a group acknowledgement for all time slots of the previous superframe, enable an assignment of retransmission slots to failed data transmissions of the previous superframe. For example, if the transmissions in slots S7, S10 and S13 have failed, retransmission slot R1 will be used for a retransmission of slot S7, slot R2 for a retransmission of slot S10 and slot R3 for a retransmission of slot S13. This assignment is achieved by scanning the acknowledgements A1 shown in FIG. 3 to determine failed transmissions. According to FIG. 3, the retransmission slots are acknowledged in the group acknowledgement before the transmission slots. Hence, the scanning of the slots does not start at bit 1, but at bit m+1 in the group acknowledgment. As a consequence, a higher retransmission probability for new data transmitted the first time is achieved compared to already retransmitted data in retransmission slots. The first nodes know the number of retransmission slots and the number of sensor slots, for instance, through configuration.

In the above example, only the acknowledgments of the transmission slots S1 to Sn may be scanned for mapping the retransmission time slots. As a consequence, only one retransmission is possible for a failed transmission. In order to allow multiple retransmissions, the acknowledgements of the retransmission time slots R1 to Rm may also be scanned after scanning the acknowledgements for the transmission slots S1 to Sn. In such a case, the first node should enforce a limit on the number of retransmissions so that it does not retransmit forever.

The above described example for defining a retransmission for failed transmissions in slots S7, S10 and S13 may be formulized by an algorithm for obtaining the number of a retransmission time slot on a first node. The pseudocode for this algorithm may be structured as follows:

Assume the following general superframe structure (TS=time slot):
m=number of retransmission time slots R1 to Rm
n=number of transmission time slots S1 to Sn
TS_0=Beacon
TS_1 to TS_m=retransmission time slots
TS_(m+1) to TS_(m+n)=transmission time slots
Ack_k=acknowledgement for TS_k
Assume, first node S_p sent a data frame in TS_(m+p).

```
If (ack_(m+p) == false) {
    num_failed := number of failed transmissions in time
    slots
        TS_(m+1) to TS_(m+p-1)
    if (num_failed < m) {
        retransmission_possible = true
        q = num_failed + 1
    }
    else {
        retransmission_possible = false
    }
    if (retransmission_possible == true) {
        retransmit at TS_q
    }
}
```

If the superframe architecture allows concatenating adjacent time slots to a single larger time slot, the above described algorithm can still be used if such a concatenated time slot is acknowledged by putting the acknowledgment into the corresponding fields of all time slots that are concatenated. For example, if the time slots TS_14 to TS_16 are concatenated and the transmission is successful, the group acknowledgement will contain a positive acknowledgment for each of the three timeslots TS_14, TS_15 and TS_16. If the transmission of the larger time slot comprising the slots TS_14 to TS_16 is not successful, the group acknowledgment will not contain a positive acknowledgement in each of the three time slots TS_14, TS_15 and TS_16.

In order to apply the above algorithm for failed transmissions of concatenated time slots, the passage "if (num_failed<m)" in the above pseudocode has to be changed to "if ((num_failed+(S1−1))<m)", with S1 being the number of concatenated time slots in the failed transmission. This ensures that the concatenated time slots fit into the area of the retransmitted time slots without disturbing the transmission time slots.

The above methodology can be implemented efficiently with basic bit operations such as bit shifts. It may be advantageous to perform counting of the number of failed transmissions while scanning through the acknowledgments independently of the value of the acknowledgement of the corresponding first node S_p. In this case, the line "num_failed: = . . . " is outside and before the line "If (ack m+p==false)" in the above pseudocode.

Depending on the CPU power and processing speed of the first node performing the above algorithm, the first node might not be fast enough to compute in time that its allocated retransmission slot is the first retransmission slot R1 in the superframe structure shown in FIG. 2. In such a case, a block of transmission slots of the group of slots S1 to Sn may be included between the beacon slot BS and the retransmission slots R1 to Rm. This measure will yield more time for computing the number of retransmission slots in a respective first node.

In the following, an example of the above described algorithm for assigning retransmission slots to first nodes will be described. According to this example, a factory automation system includes 16 first nodes so that the superframe structure shown in FIG. 2 has transmission slots S1, S2 . . . S16 for each first node. Furthermore, in each superframe, there are four time slots R1 to R4 reserved for retransmitting data. Hence, in the terminology of the above pseudocode, TS_0 refers to the beacon, TS_1 to TS_4 refer to four retransmission slots and TS_5 to TS_20 refer to 16 transmission slots.

Figure 4:
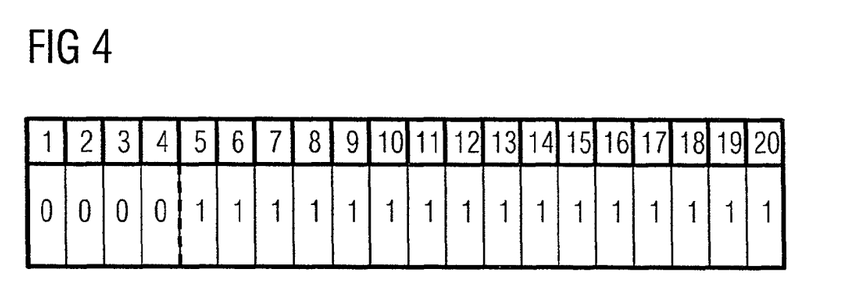
FIG. 4 to FIG. 6 show different states of first and second acknowledgements in beacons of successive time frames in accordance with an embodiment of the invention.

Furthermore, it is assumed that every first node transmits in every superframe SF. The beacon B in each superframe will contain a bitfield for the acknowledgements A2 of the retransmission slots and a bitfield for the acknowledgments A1 of the transmission slots. In cases that all transmissions by the first nodes are successful, the acknowledgements in the beacon based on the structure shown in FIG. 3 will look as shown in FIG. 4. In FIG. 4, as well as in FIGS. 5 and 6, the bit value "1" refers to a positive acknowledgement of a data transmission and the bit value "0" refers to an unsuccessful data transmission. As evident from FIG. 4, no data are retransmitted so that the bit fields of all retransmission slots are set to "0". Contrary to that, the transmissions in the transmission slots were successful, indicated by the corresponding bits set to value "1".

Figure 5:
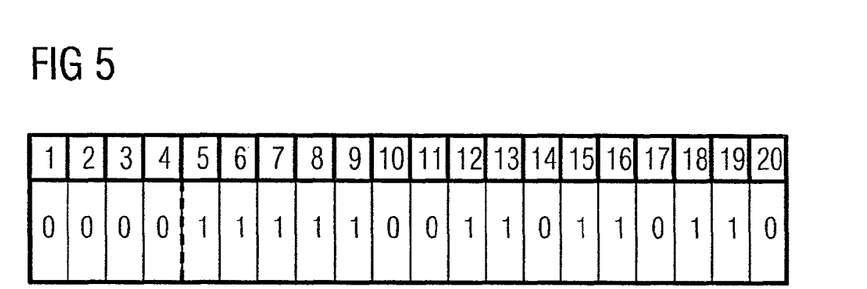

In cases that the transmissions of first nodes 6, 7, 10, 13 and 16 (i.e., first nodes with assigned transmission slots S6, S7, S10, S13 and S16) have failed in the superframe n, the corresponding acknowledgements for the time slots S6, S7, S10, S13 and S16, indicated by bits 10, 11, 14, 17 and 20, are set in superframe n+1 to bit value 0 as shown in FIG. 5. As a consequence, the above-described algorithm will now assign retransmission slots to the first nodes 6, 7, 10 and 13 but not to first node 16 because there are only four retransmission slots in a superframe. The assignments of corresponding values of variables used in the above pseudo code for the acknowledgements of FIG. 5 are summarized in the following table:

| Data Transmission | First Node 6 | First Node 7 | First Node 10 | First Node 13 | First Node 16 |
|---|---|---|---|---|---|
| m | 4 | 4 | 4 | 4 | 4 |
| p | 6 | 7 | 10 | 13 | 16 |
| ack_(m+p) | 0/ false | 0/ false | 0/ false | 0/ false | 0/ false |
| num failed | 0/ { } | 1/ {6} | 2/ {6, 7} | 3/ {6, 7, 10} | 4/ {6, 7, 10, 13} |
| retransmission_possible | true | true | true | true | False |
| q | 1 | 2 | 3 | 4 | — |
| retransmission at TS | 1 | 2 | 3 | 4 | — |

Figure 6:
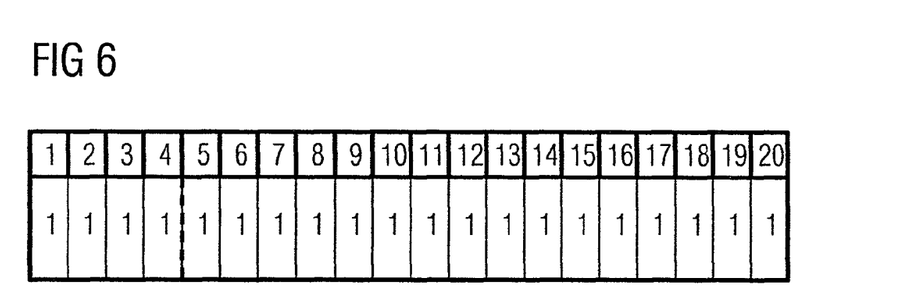

As can be seen from the above table, first node 6 will retransmit in retransmission slot R1, first node 7 will retransmit in retransmission slot R2, first node 10 will retransmit in retransmission slot R3 and first node 13 will retransmit in retransmission slot R4. First node 16 cannot retransmit its data in a retransmission slot, since all retransmission slots are already occupied by other retransmissions. Assuming that all transmissions and retransmissions have been successful in superframe n+1, the beacon of the next superframe n+2 will contain bit values "1" for all acknowledgments as shown in FIG. 6.

The contemplated embodiment of invention as described in the foregoing has several advantages. Due to the shared usage of retransmission slots in a TDMA-based data transmission, the capacities in a wireless network are used more efficiently. Particularly, the number of retransmission slots provided in a superframe can be dimensioned on a statistical basis rather than on a worst case assignment.

Due to the dynamic assignment of retransmission slots, it is possible to exclusively use slots for retransmissions while keeping the system dynamic, i.e., a retransmission slot is only exclusive for a given superframe. Collisions are avoided and, therefore, the probability of successful retransmissions is increased. The dynamic assignment of retransmission slots allows derivation of the source of the data transmissions solely based on the slot number within the superframe. Thus, the proposed system fits to the factory automation requirements where in some applications the latencies of cycle times are extremely short and address information will not be transmitted over the air.

The invention as described in the forgoing provides an efficient and simple method for the dynamic assignment of retransmission slots to first nodes requiring retransmission. According to the above described retransmission methodology, retransmissions are allowed even in cases where first nodes send (new) data in each superframe. The proposed retransmission methodology keeps the order of the data frames if only one retransmission in the next superframe is allowed.

The above-described retransmission methodology does not require additional changes in the transmission direction. There are only two changes in the transmission direction per superframe, i.e., from the beacon to retransmission time slots and from transmission time slots to the beacon of the next superframe. These changes are also necessary in a system without retransmissions.

Figure 7:
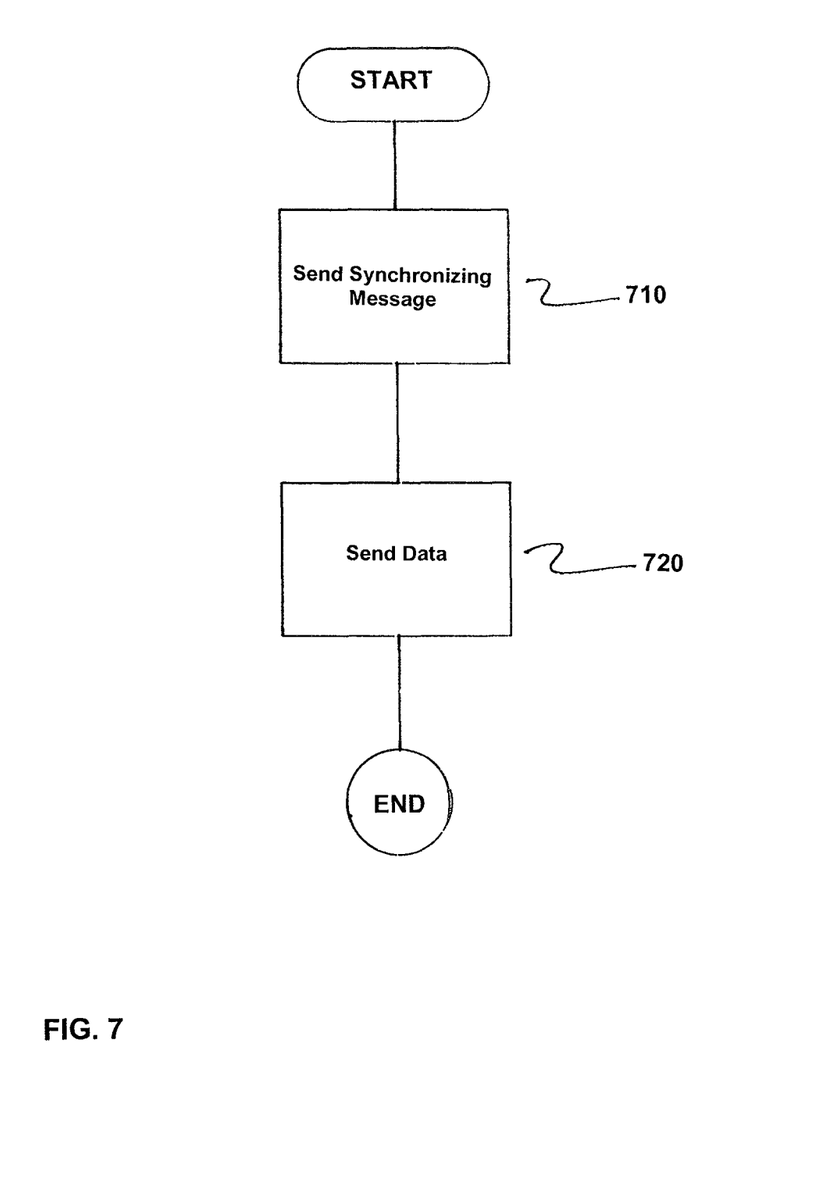
FIG. 7 is a flow chart of a method in accordance with an embodiment of the invention.

FIG. 7 is flow chart of the method for transmitting data on a Media Access Control (MAC) layer within successive time frames in a local area network between a plurality of first nodes comprising client nodes and a second node comprising a coordinator node for the plurality of first nodes in accordance with an embodiment of the invention, where each of the time frames includes a synchronization slot and a plurality of time slots including first slots and second slots. The method comprises sending, in the synchronization slot of a current time frame of the successive time frames, a synchronizing message from the second node to the first nodes to synchronize the data transmission between the first nodes and the second node, as indicated in step 710.

Data is then sent from the first nodes to the second node, as indicated in step 720. Here, each of the first nodes uses the first slots for an initial transmission of data from each of the first nodes to the second node.

In accordance with the method of the invention, the synchronizing slot of the current frame includes first acknowledgements associated with the first slots of a previous time frame preceding the current time frame, where a positive first acknowledgement for a particular first slot indicates that a data transmission in the particular first slot was successful and a negative first acknowledgement indicates that the data transmission was unsuccessful. In addition, each of the first nodes uses the second slots for retransmission of data previously transmitted in one of the first slots of the previous time frame if each of the first nodes receives a negative first acknowledgement for one of the first slots of the previous time frame in the synchronizing slot.

Thus, while there are shown, described and pointed out fundamental novel features of the invention as applied to preferred embodiments thereof, it will be understood that various omissions and substitutions and changes in the form and details of the illustrated apparatus, and in its operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

The invention claimed is:

1. A method for transmitting data on a Media Access Control layer in a local area network within successive time frames between a plurality of first nodes comprising client nodes and a second node comprising a coordinator node for the plurality of first nodes, wherein each of the time frames includes a synchronization slot and a plurality of time slots including first slots and second slots, the method comprising:
sending, in the synchronization slot of a current time frame of the successive time frames, a synchronizing message from the second node to the first nodes to synchronize the data transmission between the first nodes and the second node; and sending data from the first nodes to the second node, each of the first nodes using the first slots for an initial transmission of data from each of the first nodes to the second node;

wherein the synchronizing slot of the current frame includes first acknowledgements associated with the first slots of a previous time frame preceding the current time frame, a positive first acknowledgement for a particular first slot indicating that a data transmission in the particular first slot was successful and a negative first acknowledgement indicating that the data transmission was unsuccessful, and wherein each of the first nodes uses the second slots for retransmission of data previously transmitted in one of the first slots of the previous time frame if each of the first nodes receives a negative first acknowledgement for the one of the first slots of the previous time frame in the synchronizing slot; and wherein the first slots are arranged in a sequence of successive first slots and the second slots are arranged in a sequence of successive second slots in the successive time frames, the sequence of second slots being arranged before the sequence of first slots.

2. The method according to claim 1, wherein the data is transmitted in a wireless personal area network comprising a wireless sensor network, each of the first nodes representing a sensor transmitting sensor data to the second node representing a base station in a sensor network.

3. The method according to claim 2, wherein the data in the wireless personal area network is transmitted in accordance with IEEE standard 802.15.4.

4. The method according to claim 2, wherein the data in the wireless personal area network is transmitted in accordance with IEEE standard 802.15.4e.

5. The method according to claim 1, wherein the first acknowledgements are at least one of included in the synchronizing message and sent immediately one of before and after the synchronizing message.

6. The method according to claim 1, wherein the second node assigns the use of the second slots in the current time frame to the ones of the first nodes for which the data transmission in a first slot of the previous time frame was unsuccessful.

7. The method according to claim 1, wherein successive slot numbers are assigned to the first slots chronologically in an order of an occurrence of the first slots in the current time frame, each slot number assigning the first slot to a predetermined first node using the first slot for data transmission.

8. The method according to claim 1, wherein successive slot numbers are assigned to the second slots chronologically in an order of an occurrence of the second slots, in the current time frame.

9. The method according to claim 7, wherein one of the first node of the plurality of node intending to retransmit data due to a negative first acknowledgement for one of the first slots with a given slot number determines a slot number of the second slot to be used for retransmission by the following steps:
 i) scanning the first acknowledgements in the synchronizing slot to determine a number of unsuccessful data transmissions in the first slots having slot numbers smaller than a given slot number; and
 ii) determining a slot number of the second slot to be used for the retransmission as the number of the unsuccessful transmissions plus one.

10. The method according to claim 8, wherein one of the first nodes intending to retransmit data due to a negative first acknowledgement for one of the first slots with a given slot number determines a slot number of the second slot to be used for retransmission by:
 i) scanning the first acknowledgements in the synchronizing slot to determine a number of unsuccessful data transmissions in the first slots having slot numbers smaller than a given slot number; and
 ii) determining a slot number of the second slot to be used for the retransmission as the number of the unsuccessful transmissions plus one.

11. The method according to claim 10, wherein the second node transmitting the first acknowledgements in the synchronizing slot determines, for one of the first slots with a given slot number and associated with a negative first acknowledgement, the slot number of the second slot used for retransmitting the data previously transmitted in the one of the first slots by:
 a) scanning the first acknowledgements in the synchronizing slot to determine the number of unsuccessful data transmissions in first slots having slot numbers smaller than the given slot number;
 b) determining the slot number of the second slot used for retransmission as the number of the unsuccessful transmissions plus one.

12. The method according to claim 10, wherein the one of the first nodes does not retransmit data due to a negative first acknowledgement for the one of the first slots with a given slot number when the number of unsuccessful data transmissions determined in step i) is not smaller than the total number of second slots in the current time frame.

13. The method according to claim 11, wherein the one of the first nodes does not retransmit data due to a negative first acknowledgement for the one of the first slots with a given slot number when the number of unsuccessful data transmissions determined in step i) is not smaller than the total number of second slots in the current time frame.

14. The method according to claim 7, wherein the successive slot numbers are assigned to all time slots chronologically in an order of the occurrence of the time slots.

15. The method according to claim 1, wherein at least some of the first slots are concatenated to at least one group of the first slots, the data transmitted in at least one group of the first slots being retransmitted if any data transmission the at least one group of the first slots is unsuccessful.

16. The method according to claim 1, wherein the synchronizing slot of the current time frame includes second acknowledgements associated with the second slots, of a previous time frame preceding the current time frame, a positive second acknowledgement for a particular second slot of the second slots indicating that the data transmission in the particular second slot was successful and a negative second acknowledgement indicating that the data transmission in the particular second slot was unsuccessful.

17. The method according to claim 16, wherein the second slots are used by each of the first nodes for retransmitting data transmitted by each of the first nodes in a second slot of a previous time frame if each of the first nodes receives a negative second acknowledgement for the second slot in the synchronizing slot.

18. A local area network, comprising:
 a plurality of first nodes comprising client nodes; and
 a second node comprising a coordinator node for the first nodes;
 wherein the network is configured for data transmission on a Media Access Control layer within successive time frames between the plurality of first nodes and the second node;

wherein a current time frame of the successive time frames comprises a synchronizing slot for sending a synchronizing message from the second node to the plurality of first nodes to synchronize the data transmission between the plurality of first nodes and the second nodes, a plurality of time slots including first slots and second slots, the first slots being used for an initial transmission of data from the first nodes of the plurality of nodes to the second node;

wherein the synchronizing slot of the current frame includes first acknowledgements associated with the first slots of the slots of a previous time frame preceding the current time frame, a positive first acknowledgement for a particular first slot of the first slots indicating a data transmission in the particular first slot was successful and a negative first acknowledgement indicating that the data transmission was unsuccessful, and the second slots being used by each of the first nodes for retransmission of data previously transmitted in one of the first slots of the previous time frame if each of the first nodes receives a negative first acknowledgement for the one of the first slots of the previous time frame in the synchronizing slot; and wherein the first slots are arranged in a sequence of successive first slots and the second slots are arranged in a sequence of successive second slots in the successive time frames, the sequence of second slots being arranged before the sequence of first slots.

19. The local area network according to claim 18, wherein the local area network is configured to transmit the data in a wireless personal area network comprising a wireless sensor network, each of the first nodes representing a sensor transmitting sensor data to the second node representing a base station in a sensor network.

20. The local area network according to claim 19, wherein the data in the wireless personal area network is transmitted in accordance with IEEE standard 802.15.4.

21. The local area network according to claim 19, wherein the data in the wireless personal area network is transmitted in accordance with IEEE standard 802.15.4e.

* * * * *